(12) United States Patent
Yoshinari et al.

(10) Patent No.: US 8,002,076 B2
(45) Date of Patent: Aug. 23, 2011

(54) ELECTRIC POWER STEERING APPARATUS

(75) Inventors: Hideto Yoshinari, Tokai (JP); Masahide Harada, Yokohama (JP); Kaoru Uchiyama, Hitachiomiya (JP); Osamu Koizumi, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 466 days.

(21) Appl. No.: 11/488,079

(22) Filed: Jul. 18, 2006

(65) Prior Publication Data
US 2007/0045037 A1 Mar. 1, 2007

(30) Foreign Application Priority Data

Jul. 26, 2005 (JP) .................................. 2005-215488

(51) Int. Cl.
*B62D 5/04* (2006.01)
(52) U.S. Cl. .................. 180/444; 180/443; 180/446
(58) Field of Classification Search .................. 180/443, 180/444, 446
See application file for complete search history.

(56) References Cited

U.S. PATENT DOCUMENTS

| | | | | |
|---|---|---|---|---|
| 5,661,466 A | * | 8/1997 | Pearson | 340/686.3 |
| 5,810,111 A | * | 9/1998 | Takeuchi et al. | 180/443 |
| 6,211,631 B1 | * | 4/2001 | Wilson-Jones et al. | 318/12 |
| 6,548,972 B2 | * | 4/2003 | Takagi | 318/293 |
| 6,989,616 B2 | * | 1/2006 | Okubo et al. | 310/64 |
| 2002/0144854 A1 | * | 10/2002 | Mielke et al. | 180/443 |
| 2003/0173920 A1 | * | 9/2003 | Tominaga et al. | 318/432 |

FOREIGN PATENT DOCUMENTS

| | | |
|---|---|---|
| EP | 0 733 536 A2 | 9/1996 |
| EP | 1 359 661 A2 | 11/2003 |
| JP | 2000-23408 A | 1/2000 |
| JP | 2003-204654 A | 7/2003 |
| JP | 2003-267233 A | 9/2003 |
| WO | WO 98/10971 A | 3/1998 |

OTHER PUBLICATIONS

European Search Report dated Oct. 26, 2006 (three (3) pages).

* cited by examiner

*Primary Examiner* — Tony H. Winner
*Assistant Examiner* — Jacob Knutson
(74) *Attorney, Agent, or Firm* — Crowell & Moring LLP (57) ABSTRACT

The present invention provides an electric power steering apparatus, in which reduction and thickness thereof can be achieved, radiation performance thereof can concurrently be ensured, and manufacturing and running costs thereof can also be reduced, even when the apparatus includes a structure having a motor and a motor control device integrated therewith. The apparatus includes a motor which assists in steering operations, a motor control device which controls the motor, and a housing which accommodates the motor and the motor control device. The housing includes a motor accommodation portion which accommodates the motor, and a control device accommodation portion which accommodates the motor control device. The motor control device includes a drive unit which drives the motor, and a control unit which controls the motor. The drive unit is disposed in a position in the control device accommodation portion, the position being in proximity to the motor accommodation portion.

13 Claims, 4 Drawing Sheets

ELECTRIC POWER STEERING APPARATUS

BACKGROUND OF THE INVENTION

1. Field of the Invention

The present invention relates to an electric power steering apparatus for a vehicle and, more particularly, relates to an electric power steering apparatus in which reliability thereof is improved by enhancing the heat radiation performance of a motor control device which controls a motor and size reduction thereof is achieved.

2. Description of the Related Art

Generally, an electric power steering apparatus mounted on a vehicle is designed so that, when a driver performs a steering operation, a torque sensor detects a steering torque produced on a steering shaft, and a motor control device controls a motor based on the detected torque value in order to assist in the steering.

Recently, such an electric power steering apparatus has been widely used, being mounted on compact cars and mid-size cars in addition to light cars. Mainly, the motor and the motor control device are individually mounted on separated positions away from each other outside and inside a vehicle compartment, respectively. Thus, a long wiring harness is used to provide electric connection between the motor and the motor control device. The adoption of the long wiring harness causes various problems such as power loss due to wiring resistance, noise emission by the apparatus while the motor is being driven, and increases in the number of components.

As an example of an electric power steering apparatus in view of the above problems, there has been proposed an electric power steering apparatus including a motor accommodated in a housing, and a control circuit unit accommodated in a casing, in which the housing is disposed adjacently to the casing, and in which the motor is connected by a bus bar to the control circuit unit, whereby the motor and the control circuit unit are made into an integral structure (see JP Patent Publication (Kokai) No. 2003-204654 A).

Also proposed is, in addition to the above example, an electric power steering apparatus including a control device accommodated in the space defined by a housing and a cover of the housing, and an electric motor which is controlled by the control device, in which motor terminals each projecting from an opening of the cover for the control device is electrically connected within the electric motor (see JP Patent Publication (Kokai) No. 2003-267233 A).

SUMMARY OF THE INVENTION

Incidentally, the proportion of accommodation space (e.g. car interior space) to vehicle size has recently tended to increase in order to seek comfort. It is therefore essential that a small-sized electric power steering apparatus be mounted by taking mounting space into account.

However, the electric power steering apparatus such as the above includes a structure having the motor and the motor control device integrated therewith, which causes an increase in the height of the apparatus in a direction perpendicular to a rotating shaft of the motor. Accordingly, sufficient space for the apparatus has to be secured in order to mount the apparatus on an automobile.

There is also a demand that the electric power steering apparatus be adapted to a large type of vehicle in the future. This demand tends to cause a further increase in a generating torque required of the motor, and hence a further increase in the amount of heat generated by a switching element and a large-sized passive component (controlunit) such as a capacitor or a coil while the motor is being driven.

To take countermeasures against the generated heat, the electric power steering apparatus as previously mentioned is provided with a heat radiation fin, which is disposed in the housing in the vicinity of a motor drive circuit board in order to radiate the heat generated by the switching element while the motor is being driven. However, the heat radiation fin leads to a further increase in the outer dimensions of the electric power steering apparatus.

The present invention has been made in view of the foregoing problems. It is an object of the invention to provide an electric power steering apparatus, in which reduction in size and thickness thereof can be achieved, heat radiation performance thereof can concurrently be ensured, and manufacturing and running costs thereof can also be reduced, even when the apparatus includes a structure having a motor and a motor control device integrated therewith.

In order to achieve the above object, provided is an electric power steering apparatus according to the present invention including a motor which assists in steering, a motor control device which controls the motor, and a housing which accommodates the motor and the motor control device. The housing includes a motor accommodation portion which accommodates the motor, and a control device accommodation portion which accommodates the motor control device. The motor control device includes a drive unit which drives the motor, and a control unit which controls the motor. The drive unit is disposed in a position in the control device accommodation portion, the position being located in proximity to the motor accommodation portion.

In the case of the electric power steering apparatus of the present invention, the motor and the motor control device are accommodated in a single housing to thereby form an integral structure. This structure reduces a distance between the motor and the motor control device, thus enabling suppression of power loss, heat generation due to the resistance of wiring which provides connection therebetween, and also improving productivity. Additionally, the drive unit is disposed in proximity to the motor accommodation portion in the housing. With this disposition, heat generated by a switching element and the like which constitutes the drive unit, in particular, can be conducted to the motor along the shortest path, so that high heat radiation performance can be ensured even without the use of a heat radiation fin. In the manner as described above, it is possible to achieve reduction in cost and size of the apparatus.

In the case of the electric power steering apparatus of the present invention, the control unit is disposed in a position in the control device accommodation portion formed in a projecting portion of the housing, the position being away from the motor accommodation portion.

In the case of the electric power steering apparatus of the present invention, the motor control unit, including a power relay, a motor relay, a coil or a capacitor, which drives and controls motor drive, is disposed away from the drive unit in one direction. This disposition makes it possible to disperse heat generated by the drive unit and the control unit, thus preventing local high temperature. Moreover, this disposition makes it possible to radiate the heat generated by the control unit to the outside of the apparatus, thus achieving efficient heat radiation. Furthermore, the control unit is disposed in the accommodation portion in the projecting portion of the housing as mentioned above. This disposition reduces the thickness of the overall motor control device in the direction of the height thereof (that is, the thickness of the device in a direction perpendicular to a rotating shaft of the motor), thus making it possible to achieve reduction in size and thickness of the apparatus.

The electric power steering apparatus of the present invention is characterized in that the housing is made of a metallic material having high heat conductance. In the case of the electric power steering apparatus of the present invention, it is possible to radiate the heat generated by the switching element for driving the motor and by the heat-generating component such as the capacitor or the coil, regardless of a use environment inside a vehicle compartment or an engine room. This makes it possible to improve the heat radiation performance of the apparatus.

The electric power steering apparatus of the present invention is characterized in that the metallic material having high heat conductance is an aluminum alloying material. In the case of the electric power steering apparatus of the present invention, the aluminum alloying material is used for the metallic housing of the motor control device, thereby enhancing the heat radiation performance of the apparatus and achieving weight reduction of the apparatus.

The electric power steering apparatus of the present invention is characterized in that the drive unit is in surface contact with the control device accommodation portion with high-heat-conductance grease interposed in between. In the case of the electric power steering apparatus of the present invention, the drive unit is in surface contact with the control device accommodation portion with the high-heat-conductance grease interposed in between, thereby further facilitating the conduction of heat to the motor, thus making it possible to further enhance the heat radiation performance.

In the case of the electric power steering apparatus of the present invention, the motor control device includes a bus bar wiring board which supplies a drive current to the motor, the motor includes motor drive power terminals each projecting in a direction perpendicular to a rotating shaft of the motor, and the motor drive power terminals are connected to the bus bar wiring board.

In the case of the electric power steering apparatus of the present invention, the motor drive power terminals project toward the inside of the motor control device in the direction perpendicular to the rotating shaft of the motor, and are electrically connected to the bus bar wiring board within the motor control device. Accordingly, a wiring harness for external connection is not needed, wiring resistance is reduced, and thus heat generation is reduced, and noise emissions also reduced. Moreover, the number of components can also be reduced, thereby achieving low cost of the apparatus.

The electric power steering apparatus of the present invention is characterized in that the housing includes a cover which covers an opening of the control device accommodation portion, and the motor drive power terminals, control unit terminals, and drive unit current terminals are welded to the bus bar wiring board from the side of the cover.

In the case of the electric power steering apparatus of the present invention, the motor drive power terminals, the control unit terminals, and the drive unit current terminals are welded to the bus bar wiring board from the side of the cover of the motor control device. This enables the welding of the terminals at once after the completion of assembly of the apparatus, thus enabling an improvement in working efficiency and hence an improvement in productivity.

The electric power steering apparatus of the present invention is characterized in that the drive unit has a stacked structure including a current circuit wiring portion having the switching element mounted thereon, an insulating layer made of an electrical insulating material, and a metal plate in surface contact with the control device accommodation portion. In the case of the electric power steering apparatus of the present invention, this stacked structure makes it possible to ensure electrical insulation between the current circuit wiring portion and the metal plate, thereby the metal plate can efficiently diffuse the heat generated by the switching element.

The electric power steering apparatus of the present invention is characterized in that the metal plate is made of a copper alloying material. In the case of the electric power steering apparatus of the present invention, the copper alloying material having high heat conductance is used for the metal plate, so that heat generated by the switching element can be efficiently diffused to the metal plate made of the copper alloy having high heat conductance.

The electric power steering apparatus of the present invention is characterized in that the switching element is a bare chip. In the case of the electric power steering apparatus of the present invention, the bare chip is used as the switching element, thereby making it possible to reduce a mounting area and hence the size of the drive unit.

The electric power steering apparatus of the present invention is characterized in that the switching element is soldered to the current circuit wiring portion of the drive unit. In the case of the electric power steering apparatus of the present invention, this connection makes it possible to efficiently diffuse the heat produced by the switching element.

The electric power steering apparatus of the present invention is characterized in that a top surface of the switching element is soldered to the current circuit wiring portion of the drive unit by means of a strip-shaped conductive bridge. In the case of the electric power steering apparatus of the present invention, the electrical connection by means of the strip-shaped conductive bridge for makes it possible to omit a conventional bonding process, specifically wire bonding using a plurality of aluminum wires, thus enabling productivity improvements. Moreover, the cross-sectional area for a current to pass through the strip-shaped bridge is large, so that the resistance is low and heat generation is suppressed.

The electric power steering apparatus of the present invention is characterized in that the strip-shaped conductive bridge is made of a copper alloying material. In the case of the electric power steering apparatus of the present invention, the copper alloying material is used for the strip-shaped conductive bridge, thereby making it possible to improve the radiation of the heat generated by the switching element. Moreover, since the copper alloying material has high electrical conductivity, it is possible to reduce wiring resistance.

The electric power steering apparatus of the present invention is characterized in that the drive unit inside the housing is sealed with a hardening resin from the upside of the current circuit wiring portion. In the case of the electric power steering apparatus of the present invention, the use of the hardening resin makes it possible to fix the components mounted on the current circuit wiring portion, thus preventing damage to soldered connections, and thus improving the reliability of electrical connection.

In the case of the electric power steering apparatus of the present invention, it is possible to ensure the heat radiation performance of the apparatus main body, and to concurrently achieving reduction in size and thickness of the apparatus. Moreover, the structure with high efficiency of assembly operation makes it possible to reduce the cost of manufacturing the apparatus.

DETAILED DESCRIPTION OF THE INVENTION

The description will be given below with reference to the drawings with regard to one embodiment of an electric power steering apparatus of the present invention.

Figure 1:
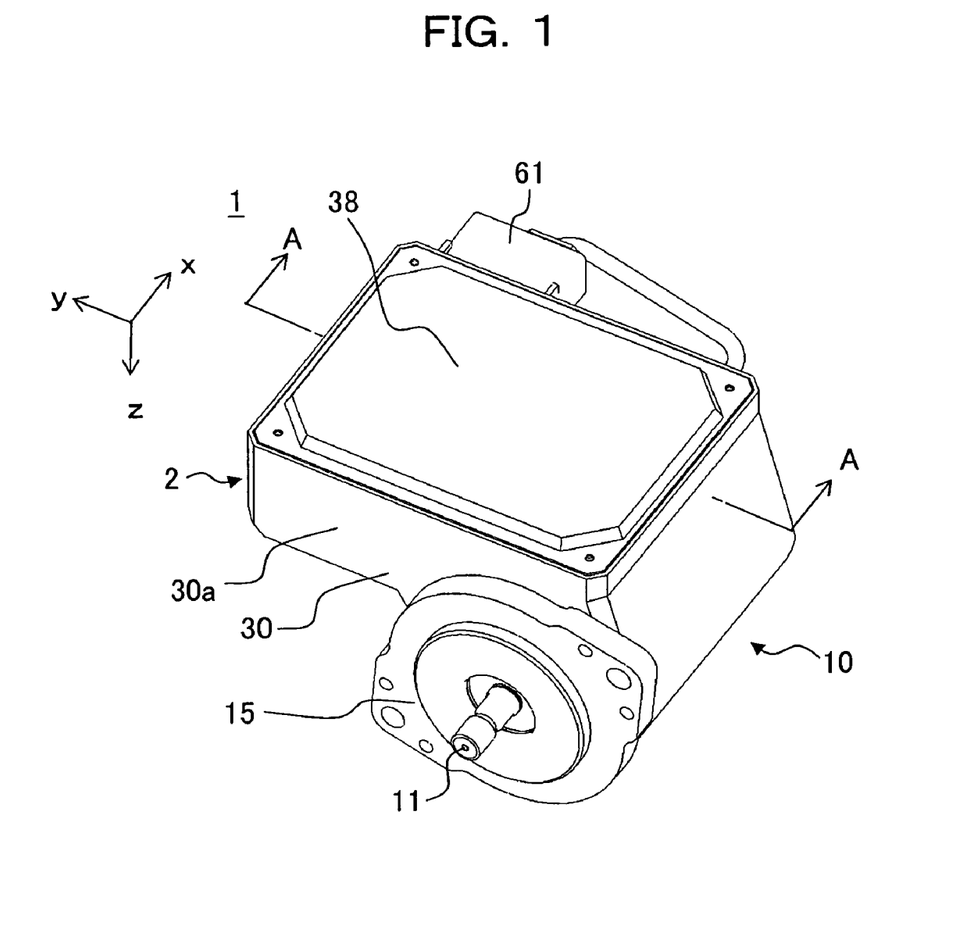
FIG. 1 is a general perspective view of an electric power steering apparatus in the case of the present embodiment.
Figure 2:
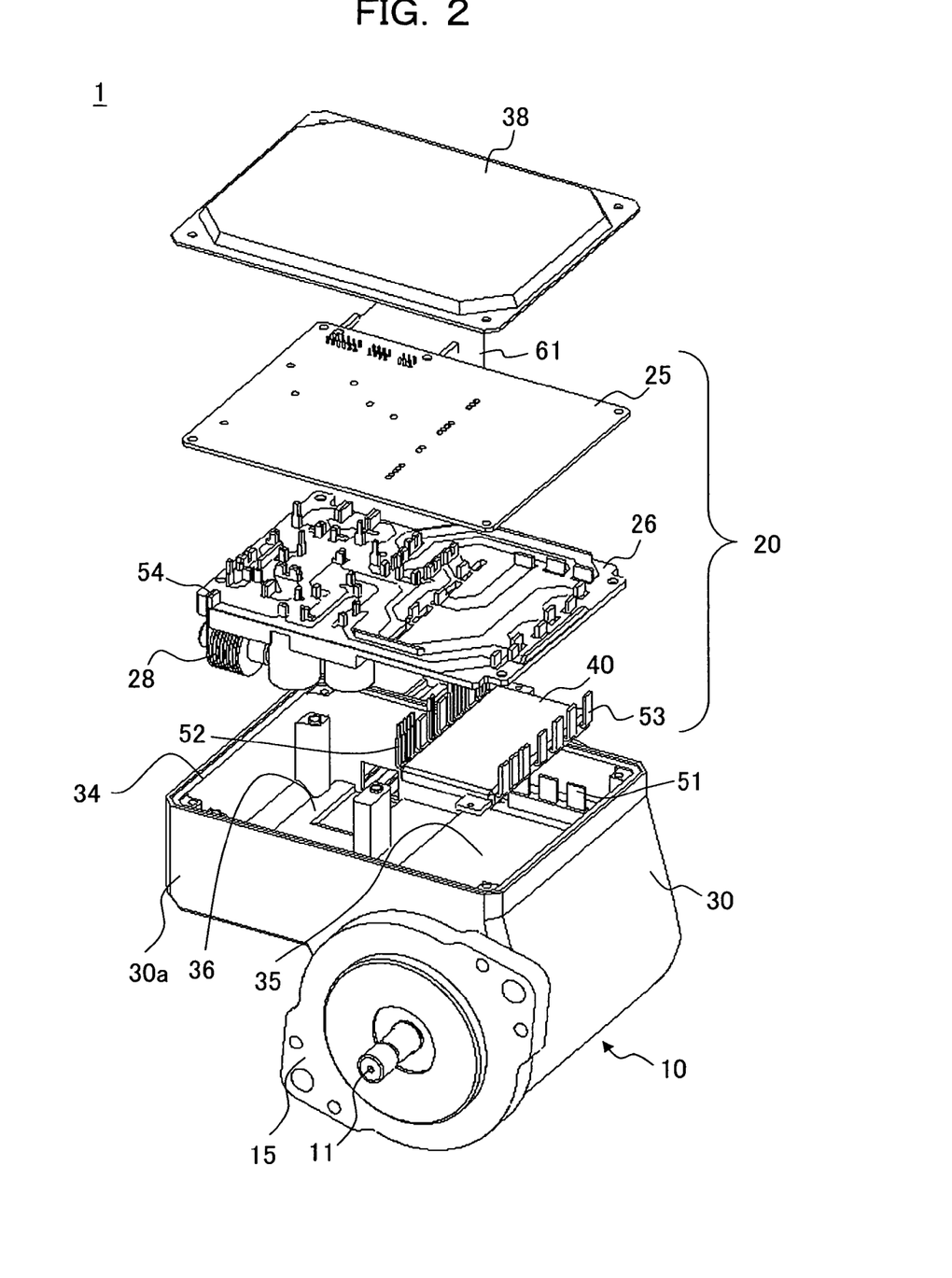
FIG. 2 is an exploded perspective view of the electric power steering apparatus shown in FIG. 1.
Figure 3:
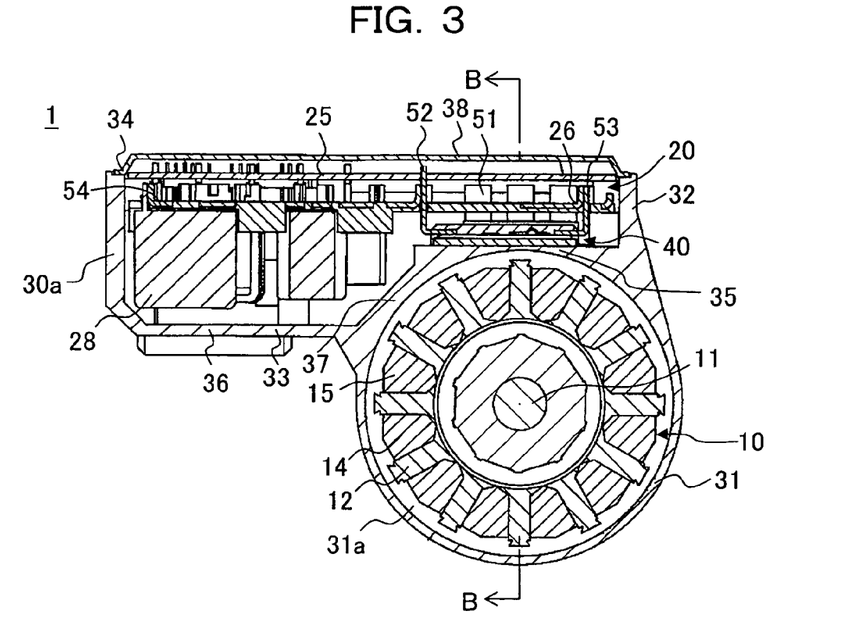
FIG. 3 is a sectional view taken along the line A-A of FIG. 1.
Figure 4:
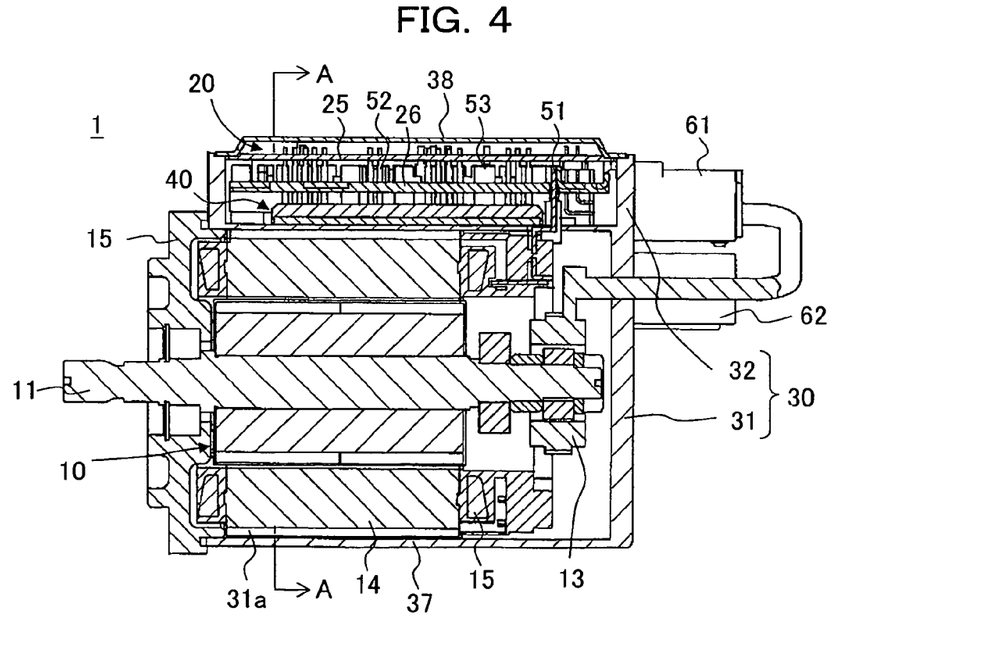
FIG. 4 is a sectional view taken along the line B-B of FIG. 3.
Figure 5:
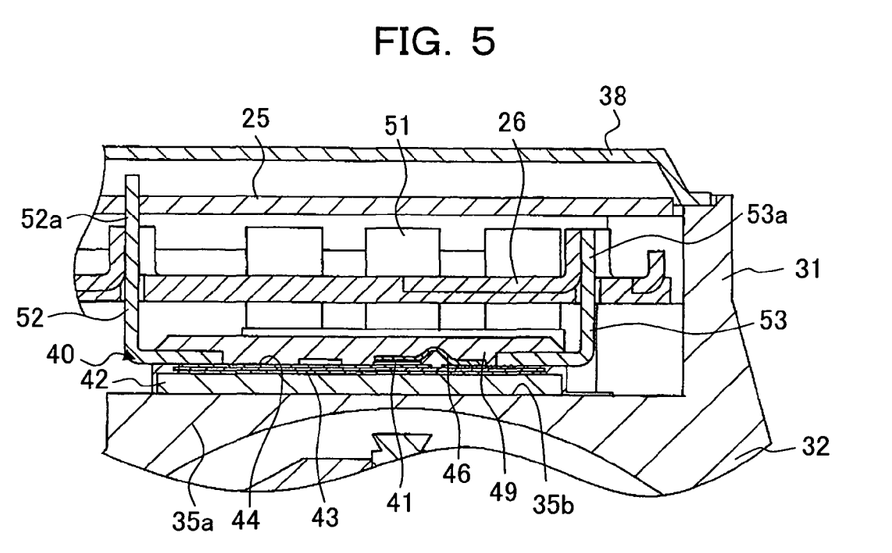
FIG. 5 is an enlarged view of a principal part of the section of FIG. 3.

FIGS. 1 to 5 show a preferred structure of the electric power steering apparatus for an automobile in the case of the present embodiment. FIG. 1 is a general perspective view of the electric power steering apparatus 1 in the case of the present embodiment. FIG. 2 is an exploded perspective view of the electric power steering apparatus 1 shown in FIG. 1. FIG. 3 is a sectional view taken along the line A-A of FIG. 1. FIG. 4 is a sectional view taken along the line B-B of FIG. 3. FIG. 5 is an enlarged view of a principal part of the section of FIG. 3.

As shown in FIGS. 1 to 5, the electric power steering apparatus 1 of the present invention for the automobile is provided mainly with a motor 10 which acts to assist in steering operations, a motor control device 20 which controls the motor 10, a housing 30 which accommodates the motor 10 and the motor control device 20, and a cover 38 which closes an opening 34 of the housing 30. The motor 10 has a main body 14 shaped like a cylinder, a motor shaft (a rotating shaft) 11 projecting from the main body 14, and a backup flange 15 fixed to the main body 14 in the circumference of the motor shaft 11.

The housing 30 has a motor accommodation portion 31 whose side is opened to accommodate the motor 10, and a control device accommodation portion 32 whose top is opened to accommodate the motor control device 20 which controls and drives the motor 10. The motor accommodation portion 31 and the control device accommodation portion 32 are integrally formed. The motor accommodation portion 31 has inner space 31a shaped like a cylinder, which is formed to extend from the side opening in the direction of the rotating shaft (i.e. the x axis of FIG. 1). It is possible to accommodate the motor 10 in the housing 30 by inserting the motor main body 14 through the opening into the inner space 31a. The opening of the motor accommodation portion 31 is configured to be closed with the backup flange 15 after the accommodation of the motor 10.

On the other hand, the control device accommodation portion 32 is a casing which is shaped like a rectangle section, whose plane shape extends in the direction of the rotating shaft (i.e. the x axis) and in the direction of the y axis perpendicular to the rotating shaft. The width of the control device accommodation portion 32 in the direction of the x axis is approximately equal to the width of the motor accommodation portion 31 (in the direction of the x axis). The width of the control device accommodation portion 32 in the direction of the y axis is greater than the width of the motor accommodation portion 31 (in the direction of the y axis) so as to form the housing 30 having a projecting portion 30a. A bottom 33 of the control device accommodation portion 32 has a stepped bottom surface having bottoms at different depths in the direction of the z axis. A shallow-depth bottom 35 is formed in series with a great-depth bottom portion 36 with a slope 37 in between. The shallow-depth bottom portion 35 of the control device accommodation portion 32 is adjacent to the motor accommodation portion 31 in a vertical direction (in the direction of the z axis) with the shallow-depth bottom portion 35 (a partition wall) interposed in between. The great-depth bottom portion 36 of the control device accommodation portion 32 constitutes a port of the portion projecting in the direction of the y axis (that is, the projecting portion 30a).

As mentioned above, the motor 10 and the motor control device 20 can be made into an integral structure. This structure makes it possible to reduce the length of wiring which connects the motor 10 and the motor control device 20, thus enabling suppression of power loss due to resistance, heat generation and the like, and also enabling productivity improvements.

Moreover, in the housing 30, the shallow-depth bottom portion 35 of the control device accommodation portion 32 is vertically laid on and adjacently (or in proximity) to the motor accommodation portion 31, and the great-depth bottom portion 36 which is one end of the control device accommodation portion 32 extends out (i.e. projects) horizontally. This configuration enables a side-by-side disposition of a drive unit 40 (to be described later) to the shallow-depth bottom portion 35, and a side-by-side disposition of a control unit 28 (to be described later) to the great-depth bottom portion 36 located away from the motor accommodation portion 31. This arrangement makes it possible to reduce the vertical height of the electric power steering apparatus as a whole.

Moreover, the motor 10 is a three-phase brushless motor. The motor shaft 11 which constitutes a rotor of the motor 10 is provided with a rotational position sensor 13 which detects the rotation angle of the motor shaft 11. A detection signal from the rotational position sensor 13 is electrically connected through a signal connector 61 to the motor control device 20 (to be described later). In addition a motor coil 13 which constitutes a stator of the motor 10 is provided with motor drive power terminals 51 which provide electric connection to the motor control device 20. The motor drive power terminals 51 project toward the motor control device 20 in the direction perpendicular (or vertical) to the motor shaft 11, and are electrically connected to a bus bar wiring board 26 (to be described later).

The motor control device 20 is disposed in the control device accommodation portion 32 of the housing 30, in parallel with the motor shaft 11 of the motor 10 (around the rotating shaft). The motor control device 20 includes a resin circuit board 25 having a microcomputer mounted thereon for controlling a drive output of the motor 10, the bus bar wiring board 26 which is a path for supplying a large drive current to the motor 10, the drive unit 40 having a motor drive switching element 41 mounted thereon, and a passive component (control unit) 28 (to be described later). The resin circuit board 25, the bus bar wiring board 26 and the drive unit 40 are disposed in the control device accommodation portion 32 of the housing 30, in sequence from the opening 34 of the control device accommodation portion 32 toward the bottom 33 thereof.

Incidentally, the motor control device 20 is provided on its side with a battery power connector 62 which provides connection to a vehicle battery, and the signal connector 61 which receives communications signals for vehicle control and detection signals from the rotational position sensor 13 of the motor shaft 11.

In addition, the drive unit 40 is disposed in proximity to the motor accommodation portion 31 in the control device accommodation portion 32. The drive unit 40 has a three-layer structure having a current circuit wiring portion 44, an insulating layer 43 made of an electrical insulating material, and a metal plate 42 made of a copper alloying material, which are stacked in sequence. On the current circuit wiring portion 44, mounted are the switching element 41, a shunt resistor which detects a current while themotor is being driven by the switching element 41, and a temperature sensor which detects the temperature of the drive unit. The metal plate 42 of the drive unit 40 is disposed on the shallow-depth bottom portion 35 in the control device accommodation portion 32. With this disposition of the drive unit 40, heat generated by the switching element 41 while the motor is being driven can be conducted from the drive unit 40 to the motor 10. In the drive unit 40, the metal plate 42 of the drive unit 40 and the shallow-depth bottom portion 35 are in surface contact with each other with high-heat-conductance grease interposed in between. The metal plate 42 is fixed to the shallow-depth bottom portion 35 with screws or the like. This configuration makes it possible to further improve the conduction of the heat to the motor 10.

Moreover, it is preferable that a wiring portion of the current circuit wiring portion 44 is made of a copper alloying material and that the insulating layer 43 is made of a silicon nitride material, an aluminum nitride material, or an epoxy resin material with high heat conductance. It is preferable that a tough pitch copper material or an oxygen-free copper material with higher heat conductance and lower thermal expansion than other metallic materials, for example, is used for the metal plate 42. In addition to these materials, an aluminum alloy with higher heat conductance and lower specific gravity than other metallic materials, or a copper-molybdenum alloy, a copper-tungsten alloy or aluminum-silicon-carbide whose characteristic is an extremely low coefficient of thermal expansion may also be used for the metal plate 42.

On the other hand, the large-sized passive component (control unit) 28 for controlling the motor 10 is configured of a power relay, a motor relay, a coil, and a capacitor and so on. As shown in FIG. 3, the passive component 28 is disposed in a position in the control device accommodation portion 32 formed in the projecting portion 30*a* of the housing 30, the position being away from the motor accommodation portion 31. The passive component 28 is disposed away from the drive unit 40 in one direction, as mentioned above. Accordingly, local heat generation is prevented, and concurrently the heat generated by the passive component 28 is radiated to the outside of the apparatus (i.e. radiated into the atmosphere). Moreover, the drive unit 40 and the passive component 28 are disposed in parallel with the bottom 33 of the housing 30. This disposition makes it possible to reduce the thickness of the electric power steering apparatus 1 in the direction of the height thereof (that is, the height of the control device accommodation portion 32), thus achieving reduction in size and thickness of the apparatus.

Moreover, the drive unit 40 includes drive unit signal terminals 52 with a cross section shaped like "L" provided on one end of the current circuit wiring portion 44, and drive unit current terminals 53 with a cross section shaped like "L" provided on the other end of the current circuit wiring portion 44. Connections 52*a* and 53*a* of the terminals 52 and 53 are disposed so as to project perpendicularly to the board surfaces of the bus bar wiring board 26 and the resin circuit board 25 which are disposed above the current circuit wiring portion 44. The connections 52*a* of the drive unit signal terminals 52 are soldered to the resin circuit board 25, and the connections 53*a* of the drive unit current terminals 53 are welded to the bus bar wiring board 26. The provision of the connections 52*a* and 53*a* of the terminals 52 and 53 perpendicular to the board surfaces of the bus bar wiring board 26 and the resin circuit board 25, as mentioned above, enables terminal connection from one direction, thus improving the workability of terminal connection.

Moreover, the switching element 41 mounted on the drive unit 40 is a bare chip, which is soldered to the current circuit wiring portion 44. This chip configuration enables reducing a mounting area and hence the size of the drive unit 40.

In addition, an electrode pad on a top surface of the switching element 41 is soldered to the current circuit wiring portion 44 by means of a strip-shaped conductive bridge (so-called a lead frame) 46. The strip-shaped conductive bridge 46 is made of a copper alloying material. Preferably, a tough pitch copper material or an oxygen-free copper material having high heat conductance and low thermal expansion, for example, is used as the copper alloying material. In addition to these materials, however, a copper-molybdenum alloy material or a copper-tungsten alloy material whose characteristic is an extremely low coefficient of thermal expansion as compared to other metallic materials may be used as the copper alloying material.

Moreover, the drive unit 40 disposed on the shallow-depth bottom portion 35 of the control device accommodation portion 32 is sealed with a thermal hardening resin 49 from the upside of the current circuit wiring portion 44. This results in fixing the components mounted on the current circuit wiring portion 44, thus preventing damage to the soldered connections, and thus improving the reliability of electric connection.

The bus bar wiring board 26 is formed by pressing a thick copper plate, which is used as a raw material, to form a current wiring portion (not illustrated) and a signal wiring portion (not illustrated), and then by performing insert molding to the resultant wiring portions with a thermal hardening resin. As previously mentioned, the bus bar wiring board 26 is disposed by being interposed in between the resin circuit board 25 and the drive unit 40.

Moreover, the current wiring portion of the bus bar wiring board 26 is welded to the motor drive power terminals 51, the drive unit current terminals 53, and passive component terminals (control unit terminals) 54 (to be described later) from the side of the housing cover 38 of the housing 30. Specifically, the signal wiring portion of the bus bar wiring board 26 is welded to the passive component 28 (to be described later) with the passive component terminals 54 interposed in between in order to transmit control signals from the passive component 28 to the resin circuit board 25, and the signal wiring portion is also soldered to the resin circuit board 25. Incidentally, all the terminals extending from each of the components and boards toward the bus bar wiring board 26 are bent toward the housing cover 38 perpendicularly to the board surface of the bus bar wiring board 26. This terminal structure achieves Simplification of the manufacturing process and hence an improvement in the productivity of the apparatus.

Moreover, as mentioned above, the resin circuit board 25 is disposed parallel to the bus bar wiring board 26 and toward the housing cover 38, and the resin circuit board 25 is electrically connected through a screwed signal connector 61 to the outside. Moreover, the resin circuit board 25 is electrically connected to a shunt resistor of the drive unit 40, and is provided with a microcomputer (not illustrated) which detects a current while the motor 10 is being driven and which controls an output of the motor 10 depending on a steering torque produced on a steering shaft.

Incidentally, it is preferable that the housing 30 which accommodates the motor 10 and the motor control device 20 is made of a metallic material having higher heat conductance than other metallic materials. More preferably, the housing 30 is made of an aluminum alloying material, such as cast aluminum produced by aluminum die casting, in terms of improvements in mass production, weight reduction and heat radiation performance. Alternatively, cutting may be performed to form the housing 30. A metallic material such as an aluminum alloy material formed by pressing is used for the housing cover 38 in terms of improvements in mass production and heat radiation performance. In addition to this, the housing cover 38, however, may be made of a heat resistance synthetic resin, specifically a PET (polyethylene terephthalate) resin, a PPS (polyphenylene sulfide) resin or a PBT (polybutylene terephthalate) resin, since these resins are lightweight and excellent in heat resistance.

The electric power steering apparatus configured as mentioned above functions as follows. When a driver performs steering, the switching element 41 mounted on the drive unit 40 of the motor control device 20 is energized, so that the drive unit 40 generates heat. Then, the heat generated by the drive unit 40 is conducted from the drive unit 40 through the metal plate 42 to the motor 10 along the shortest path. Accordingly, the radiation of the heat from the motor control device 20 can be accelerated.

Moreover, in order to control an output of the motor 10, the passive component 28 is also energized and generates heat. The passive component 28 is disposed away from the drive unit 40, and concurrently, the passive component 28 is disposed in the projecting portion 30a of the housing 30 (i.e. in a position in the control device accommodation portion 32, the position being away from the motor accommodation portion 31). This disposition prevents local high temperature and also facilitates the radiation of the heat generated by the passive component 28 from the apparatus to the outside.

Although the detailed description has been given above with regard to one embodiment of the electric power steering apparatus according to the present invention, it is to be understood that the invention is not limited to the above embodiment and that various design changes may be made in the invention without departing from the spirit and scope of the invention as defined in the appended claims.

In the embodiment of the present invention, the control device accommodation portion is configured to have the shallow-depth bottom portion and the great-depth bottom portion. However, the control device accommodation portion may have a flat bottom portion. In other words, the control device accommodation portion may have any configuration, provided that the motor accommodation portion is in proximity to the drive unit of the motor control device. In addition, the motor accommodation portion is not limited to having the inner space shaped like a cylinder but may have inner space shaped like a rectangular parallelepiped. The inner space is not particularly limited in its shape, provided that the inner space can accommodate the motor.

As an example, the passive component of the motor control device is disposed away from the drive unit in one direction. However, the passive components may be dispersedly disposed, provided that the passive component can be disposed away from the drive unit.

Incidentally, in the embodiment of the present invention, the drive unit within the housing is sealed with a hardening resin from the side of the current circuit wiring portion. However, a thermal hardening resin may be used as the hardening resin, provided that the resin can fix the components mounted on the current circuit wiring portion. The type of resin is not particularly limited.

What is claimed is:

1. An electric power steering apparatus comprising:
a motor including a rotor and a cylindrical stator provided to surround the rotor, the motor being adapted to assist in steering operations through a torque of the rotor,
a motor control device including a drive unit which drives the motor, and a control unit which controls the motor, and
a housing including a first region for accommodating therein the motor, a second region for accommodating therein the motor control device, and a partition wall that partitions the housing into the first region and the second region, wherein
the partition wall is integrally formed with the housing,
the drive unit includes a heat generating element, a heat radiating metal plate for radiating heat generated by the heat generating element, and an insulating layer fixed between the heat generating element and the heat radiating metal plate, the heat radiating metal plate being in surface contact with the partition wall such that the heat radiating metal plate has a plane extending between a circumferential wall of the first region, adjacent the partition wall, and the insulating layer, the heat generating element, the insulating layer, and the metal plate together forming a stacked structure by which heat generated by the heat generating element is conducted directly to the motor and then radiated away along a first path rather than by way of the control unit,
the housing includes, as a part of the second region for accommodating therein the motor control device, a projecting portion formed to extend parallel with the heat radiation plane, and
the control unit is accommodated away from the drive unit in a region defined by the projecting portion so that heat generated by the control unit is radiated directly along a second path to the outside of the housing.

2. The electric power steering apparatus as claimed in claim 1, wherein the housing is made of a metallic material having high heat conductance.

3. The electric power steering apparatus as claimed in claim 2, wherein the metallic material having high heat conductance is an aluminum alloying material.

4. The electric power steering apparatus as claimed in claim 1, wherein the heat radiating metal plate is in surface contact with the partition wall of the housing with high-heat-conductance grease interposed in between.

5. The electric power steering apparatus as claimed in claim 1, wherein
the motor control device includes a bus bar wiring board which supplies a drive current to the motor,
the motor includes motor drive power terminals each projecting in a direction perpendicular to a rotating shaft of the motor, and
the motor drive power terminals are connected to the bus bar wiring board.

6. The electric power steering apparatus as claimed in claim 5, wherein
the housing includes a cover which covers an opening through which the motor control device is inserted to be accommodated in the second region of the housing, and
the motor drive power terminals, control unit terminals, and drive unit current terminals are welded to the bus bar wiring board from the side of the cover.

7. The electric power steering apparatus as claimed in claim 1, wherein the heat generating unit includes a current circuit wiring portion and a switching element mounted on the current wiring portion.

8. The electric power steering apparatus as claimed in claim 7, wherein the metal plate is made of a copper alloying material.

9. The electric power steering apparatus as claimed in claim 7, wherein the switching element is a bare chip.

10. The electric power steering apparatus as claimed in claim 9, wherein the switching element is soldered to the current circuit wiring portion.

11. The electric power steering apparatus as claimed in claim 7, wherein a top surface of the switching element is soldered to the current circuit wiring portion by a strip-shaped conductive bridge.

12. The electric power steering apparatus as claimed in claim 11, wherein the strip-shaped conductive bridge is made of a copper alloying material.

13. The electric power steering apparatus as claimed in claim 7, wherein the drive unit within the housing is sealed with a hardening resin from the upside of the current circuit wiring portion.

* * * * *